(12) United States Patent
Wedel et al.

(10) Patent No.: US 7,167,869 B2
(45) Date of Patent: Jan. 23, 2007

(54) REPRESENTING HIERARCHICAL LIST DATA

(75) Inventors: Malte Wedel, Heidelberg (DE); Andreas Roessler, Sulzfeld (DE)

(73) Assignee: SAG AG, Walldorf (DE)

(*) Notice: Subject to any disclaimer, the term of this patent is extended or adjusted under 35 U.S.C. 154(b) by 489 days.

(21) Appl. No.: 10/672,073

(22) Filed: Sep. 26, 2003

(65) Prior Publication Data
US 2005/0071308 A1 Mar. 31, 2005

(51) Int. Cl.
G06F 7/00 (2006.01)
G06F 17/00 (2006.01)

(52) U.S. Cl. .................. 707/101; 707/10; 707/102
(58) Field of Classification Search ........... 707/100, 707/101, 102, 10
See application file for complete search history.

(56) References Cited

U.S. PATENT DOCUMENTS 6,401,092 B1* 6/2002 Donohoe et al. ............ 707/10

2004/0001077 A1* 1/2004 Patterson .................... 345/700

OTHER PUBLICATIONS

Fultz, "Customizing the X Front End, Handling Large Lists, and Generating Surface Plots", The Mathematica Journal, vol. 4, Iss. 2, pp. 54-61, Miller Freeman Publications, 1994.*

* cited by examiner

Primary Examiner—Jeffrey Gaffin
Assistant Examiner—Michael J. Hicks
(74) Attorney, Agent, or Firm—Finnegan, Henderson, Farabow, Garrett & Dunner, L.L.P.

(57) ABSTRACT

Methods and apparatus, including computer program products, for representing hierarchical list data. One method involves receiving a first list comprising an element A1 and an element A2, the element A2 comprising a first nested list comprising an element N1 and an element N2; receiving a second list comprising an element B1 and an element B2, the element B2 comprising a second nested list comprising an element M1 and an element M2; storing the elements A1 and B1 in a first array; and storing the elements A2 and B2 in a second array, the second array comprising a first sub-array to store the elements N1 and M1, and a second sub-array to store the N2 and M2.

14 Claims, 4 Drawing Sheets

| ID | Orders | |
|---|---|---|
| | Qty | Item |
| xyz | 1 | Computer |
| | 1 | Monitor |
| | Qty | Item |
| abc | 2 | Scanner |
| | 1 | Power Supply |

100 ⤳

|  | 130 | 160 140 170 | |
|---|---|---|---|
|  | *ID* | *Orders* | |
| 110 { | xyz | Qty | Item |
|  |  | 1 | Computer |
|  |  | 1 | Monitor |
| 120 { | abc | Qty | Item |
|  |  | 2 | Scanner |
|  |  | 1 | Power Supply |

150 encompasses the Qty/Item rows for xyz.

FIG. 1

```
CUSTOMERS:[
    {ID="xyz"
    ORDERS=[
        { =1
        ITEM="computer"}
        {POS=2
        ITEM="monitor"}]
    }                                   } 210

{ID="abc"
    ORDERS=[
        {POS=1
        ITEM="scanner"}
        {POS=2
        ITEM="power supply}]
    }]                                  } 220
```

FIG. 2

```
CUSTOMERS:{
  ID["xyz","abc"] }310
  ORDERS:{
    QTY:[[1,2],[1,2]]
    ITEM:[["computer","monitor"],["scanner","power supply"]]} }320
}
```

REPRESENTING HIERARCHICAL LIST DATA

BACKGROUND

The present invention relates to data processing by digital computer, and more particularly to representing hierarchical list data.

The term list data refers to data that is organized as a list. A list is a data structure that holds data in a sequential order. Lists are often stored using a cell and pointer arrangement where each value is stored in a cell along with an associated pointer to the next cell.

The term hierarchical list data refers to list data where at least one of the elements in the list is itself a list. A list within a list is known as a nested list. Hierarchical list data can include more than one level of nesting. For example, a nested list can contain yet another nested list as one of its elements.

Business and other types of data often include hierarchical list data. The manner in which hierarchical list data is organized and represented can affect the amount of memory required to store such data, as well as the amount of time required to access and process the data.

SUMMARY OF THE INVENTION

The present invention provides methods and apparatus, including computer program products, for representing hierarchical list data.

In general, in one aspect, a product is operable to cause data processing apparatus to perform the operations of receiving a first list comprising an element A1 and an element A2, the element A2 comprising a first nested list comprising an element N1 and an element N2; receiving a second list comprising an element B1 and an element B2, the element B2 comprising a second nested list comprising an element M1 and an element M2; storing the elements A1 and B1 in a first array; and storing the elements A2 and B2 in a second array, the second array comprising a first sub-array to store the elements N1 and M1, and a second sub-array to store the N2 and M2.

The invention can be implemented to include one or more of the following advantageous features. Storing the elements A1 and B1 in a first array and storing the elements A2 and B2 in a second array each includes using a tree data structure to parse the first and second lists. The tree data structure includes a first node representing element A1, a second node representing element A2, and a third node representing the element N1, the third node being arranged as a child of the second node. The operations further include transferring the first and second arrays between a client and a server.

In general, in another aspect, a product is operable to cause data processing apparatus to perform the operations of receiving a first array that contains elements A1 and B1; receiving a second array that contains elements A2 and B2, the second array comprising a first sub-array that contains elements N1 and M1, and a second sub-array that contains elements N2 and M2; and generating a first and second list based on the first and second arrays, the first list comprising the element A1 and the element A2, the element A2 comprising a first nested list comprising the element N1 and the element N2; the second list comprising the element B1 and the element B2, the element B2 comprising a second nested list comprising the element M1 and the element M2.

The invention can be implemented to include one or more of the following advantageous features. Generating a first and second list includes using a tree data structure to parse the first and second arrays. The tree data structure includes a first node representing element A1; a second node representing element A2; and a third node representing the element N1, the third node being arranged as a child of the second node.

The invention can be implemented to realize one or more of the following advantages. Hierarchical list data can be organized in a manner that improves access time and that makes it easier to modify the data. Hierarchical list data can be organized in a manner that reduces the amount of memory required to store such data, as well as the amount of bandwidth required to transfer the data across a network. One implementation of the invention provides all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

FIG. 1 is a block diagram of hierarchical list data in tabular form.

FIG. 2 is a block diagram of a representation of hierarchical list data.

Like reference numbers and designations in the various drawings indicate like elements.

DETAILED DESCRIPTION

Figures 3, 4:
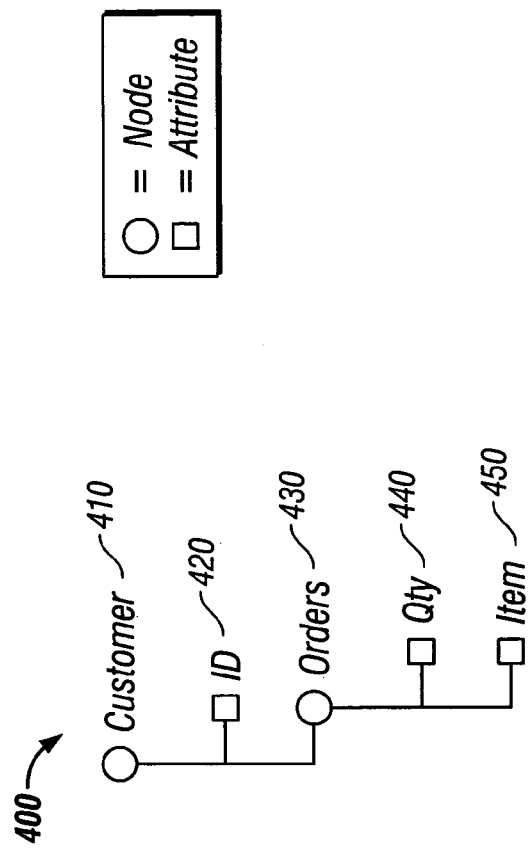
FIG. 3 is a block diagram of another representation of hierarchical list data.
FIG. 4 is a block diagram of a metadata tree.

Hierarchical list data can be represented as a table where each row of the table represents a list, each column of the table represents a list element, and at least one of the columns contains another table that represents a nested list. This is illustrated in FIG. 1.

FIG. 1 shows a table 100 of customer information. The first row of the table 100 represents a first list 110 that stores the information about a first customer and the second row of the table represents a second list 120 that stores information about a second customer.

The first column of the table 100 represents the first element 130 of each list. In the example shown, the first element 130 of each list stores the customer ID of the customer. The second column of the table 100 represents the second element 140 of each list. In the example shown, the second element 140 stores a nested list 150 of the orders placed by each customer. The nested list 150 contains a first element 160 that stores the quantity of an ordered item and a second element 170 that stores the name of the ordered item.

Hierarchical list data, e.g., the hierarchical list data from the example in FIG. 1, can be organized and represented as multiple arrays. The arrays can include one or more levels of sub-arrays, each sub-array storing one or more elements from a nested list.

In one implementation, the arrays are row-oriented, meaning that each array represents a separate list or table row. This organization is illustrated in FIG. 2, which shows a first array 210 that stores the first list 110, and a second array 220 that stores the second list 120. This organization can be thought of as a row-wise representation because each row of data is represented as a separate array.

Alternatively, the arrays can be column-oriented, with each array storing one column of the table, or one element (the n-th element) from each list. This organization is illustrated in FIG. 3, which shows a first array 310 that stores the first list element 130 (ID) of each list, and a second array 320 that stores the second list element 140 (ORDERS) of each list. A second level of arrays is nested within the second array 320. This second level of arrays is used to store the contents of the nested lists 150. The second level of arrays includes a first sub-array 330 that stores the first elements 160 of the nested lists 150, and a second sub-array 340 that stores the second elements 170 of the nested lists 160.

A column-wise representation of hierarchical list data can provide certain advantages over a row-wise representation of such data. First, a column-wise representation can eliminate redundancy because the column header names (e.g., "ID" and "ORDERS") do not need to be repeated for each row or list. Second, a column-wise representation can improve the performance of actions that are performed on the hierarchical list data. For example, elements (such as "ORDERS") can be added or deleted from the lists without requiring access to or modification of unrelated elements. Moreover, operations that require access to or processing of certain elements or columns can run more quickly than in implementations in which the hierarchical list data is represented in a row-wise arrangement.

A data structure, e.g., a tree, can be used to store metadata that describes the organization of the hierarchical list data. The tree can include multiple nodes arranged in a hierarchy. Each node can be either a non-leaf node or a leaf node.

FIG. 4 shows a metadata tree 400 that describes the organization of the hierarchical list data from the example in FIG. 1. For each list 110, 120, the metadata tree includes a node 410 (CUSTOMER) that describes the list. The node 410 contains two child nodes, a leaf node 420 (ID) that describes the first element 130 of the list, and a non-leaf node 430 (ORDERS) that describes the second element 140 of the list. The non-leaf node 430 includes two child nodes, a leaf node 440 (QTY) that describes the first element 160 of the nested list 150, and another leaf node 450 (ITEM) that describes the second element 170 of the nested list 150.

Figure 5:
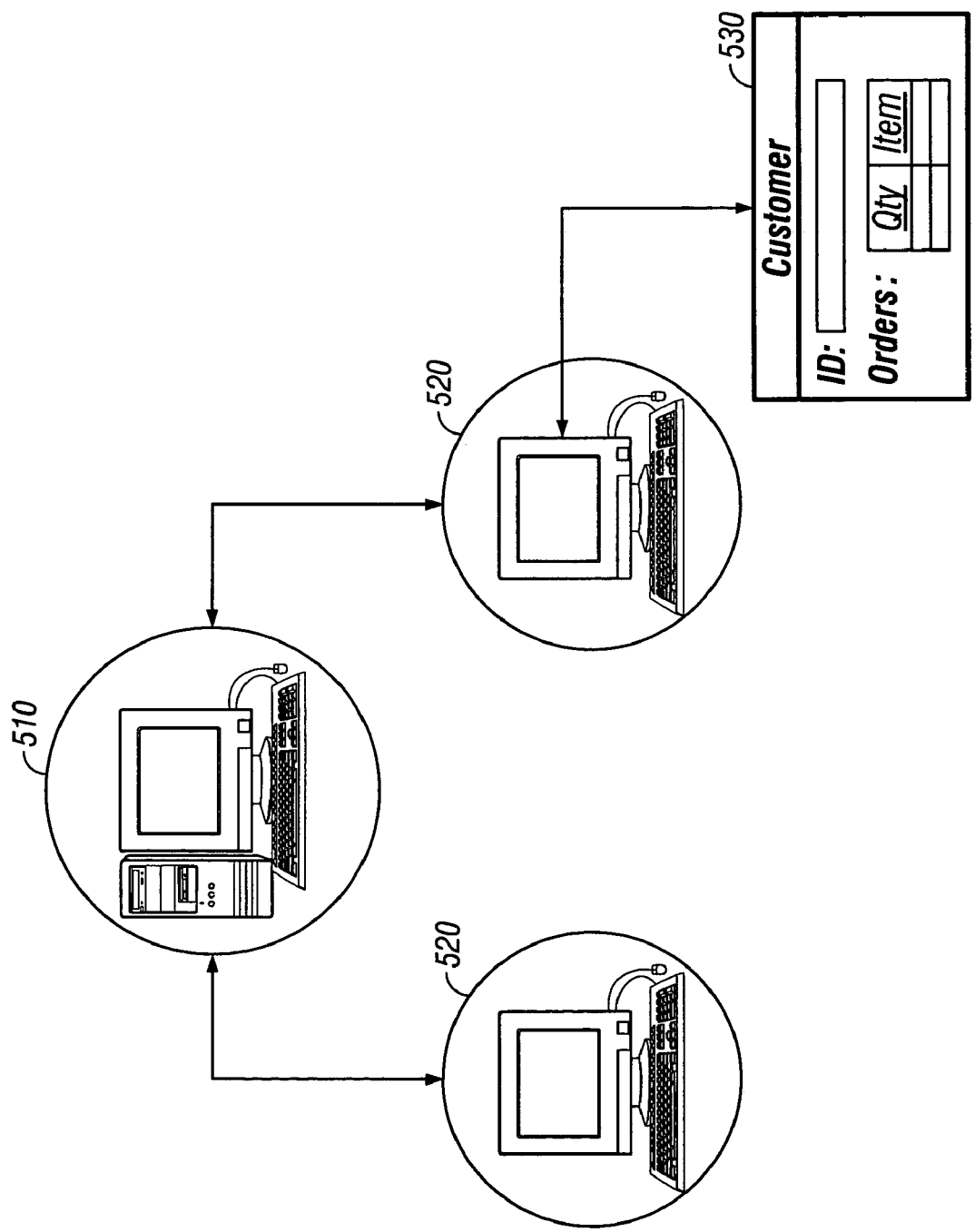
FIG. 5 is a block diagram of a distributed environment for transferring hierarchical list data.

The above-described data organizations can be used for a variety of purposes, including, for example, transferring hierarchical data between a first computer 510 and a second computer 520 in a distributed environment, e.g., the one shown in FIG. 5. The first computer 510 and the second computer 520 can have a client-server relationship with each other. Other network configurations, for example, peer-to-peer relationships, are also possible.

Figure 6:
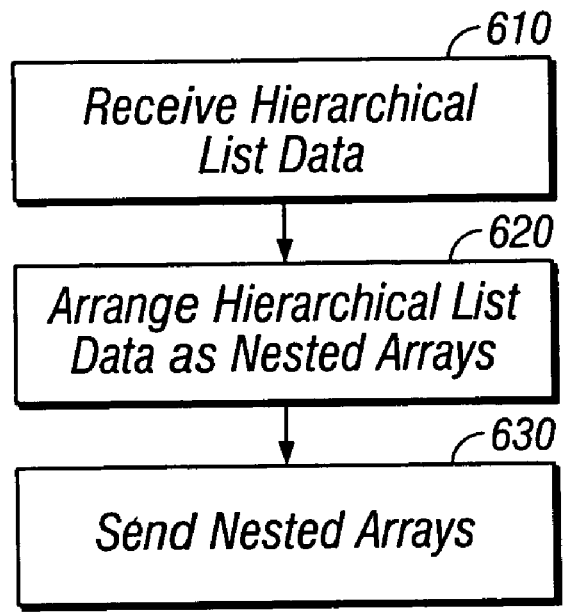
FIG. 6 is a flow diagram of a method for sending hierarchical list data.

In operation, as shown in FIG. 6, the second computer 520 receives hierarchical list data, for example, from a user through a user interface on the second computer (step 610). The user interface can display a form 530 into which a user can enter data. Alternatively, the second computer 520 can receive hierarchical data from a database that is stored on the second computer 520 or that is stored in a remote location that is accessible by the second computer 520. The hierarchical data can be data that is stored in one or more database records or database tables.

The second computer 520 arranges the hierarchical list data as nested arrays as described above (step 620). The second computer can arrange the hierarchical list data, for example, in the row-wise manner or in the column-wise manner.

The second computer 510 then sends the nested arrays to the first computer 510 (step 530). A metadata tree can also be sent along with the nested arrays to facilitate the parsing and processing of the nested arrays.

Figure 7:
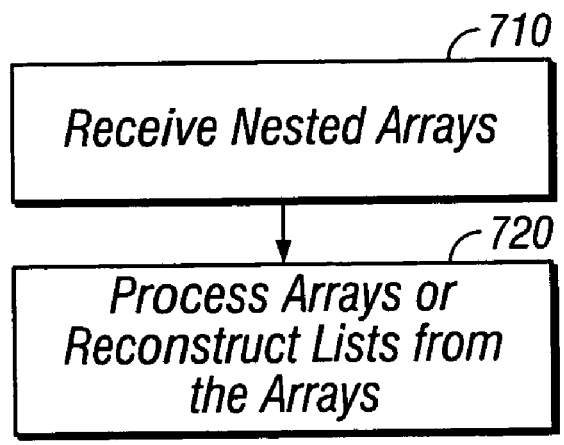
FIG. 7 is a flow diagram of a method for receiving hierarchical list data.

As shown in FIG. 7, the first computer 510 receives the nested arrays from the second computer 520 (step 710). The first computer 510 can then process the data in the nested arrays directly, or reconstruct the original form of the hierarchical list data (step 720). In doing so, the first computer 510 can use a metadata tree to determine the organization of the data. For example, the first computer 510 can use the metadata tree of FIG. 4 to determine that the nested arrays in FIG. 3 are to be interpreted as data about two customers (the ID of the first being "xyz" and the ID of the second being "abc"), and the orders placed by those customers (the order for the first customer including a request for one computer and two monitors, and the order for the second customer including a request for one scanner and two power supplies).

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD- ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims.

What is claimed is:

1. A computer program product, tangibly embodied in an information carrier, for representing hierarchical list data, the computer program product being operable to cause data processing apparatus to perform operations comprising:
   receiving a first list comprising an element A1 and an element A2, the element A2 comprising a first nested list comprising an element N1 and an element N2;
   receiving a second list comprising an element B1 and an element B2, the element B2 comprising a second nested list comprising an element M1 and an element M2;
   storing the elements A1 and B1 in a first array;
   storing the elements A2 and B2 in a second array, the second array comprising a first sub-array to store the elements N1 and M1, and a second sub-array to store the N2 and M2; and
   displaying data stored in the first array and the second array.

2. The product of claim 1, wherein storing the elements A1 and B1 in a first array and storing the elements A2 and B2 in a second array each includes:
   using a tree data structure to parse the first and second lists.

3. The product of claim 2, wherein the tree data structure includes:
   a first node representing element A1;
   a second node representing element A2; and
   a third node representing the element N1, the third node being arranged as a child of the second node.

4. The product of claim 1, wherein the operations further comprise:
   transferring the first and second arrays between a client and a server.

5. A computer program product, tangibly embodied in an information carrier, for representing hierarchical list data, the computer program product being operable to cause data processing apparatus to perform operations comprising:
   receiving a first array that contains elements A1 and B1;
   receiving a second array that contains elements A2 and B2, the second array comprising a first sub-array that contains elements N1 and M1, and a second sub-array that contains elements N2 and M2; and
   generating a first and second list based on the first and second arrays, the first list comprising the element A1 and the element A2, the element A2 comprising a first nested list comprising the element N1 and the element N2; the second list comprising the element B1 and the element B2, the element B2 comprising a second nested list comprising the element M1 and the element M2; and
   displaying data stored in the first list and the second list.

6. The product of claim 5, wherein generating a first and second list includes:
   using a tree data structure to parse the first and second arrays.

7. The product of claim 6, wherein the tree data structure includes:
   a first node representing element A1;
   a second node representing element A2; and
   a third node representing the element N1, the third node being arranged as a child of the second node.

8. Apparatus comprising:
   means for receiving a first list comprising an element A1 and an element A2, the element A2 comprising a first nested list comprising an element N1 and an element N2;
   means for receiving a second list comprising an element B1 and an element B2, the element B2 comprising a second nested list comprising an element M1 and an element M2;
   means for storing the elements A1 and B1 in a first array;
   means for storing the elements A2 and B2 in a second array, the second array comprising a first sub-array to store the elements N1 and M1, and a second sub-array to store the N2 and M2; and
   means for displaying data stored in the first array and the second array.

9. The apparatus of claim 8, wherein the means for storing the elements A1 and B1 in a first array and the means for storing the elements A2 and B2 in a second array each includes:
   means for using a tree data structure to parse the first and second lists.

10. The apparatus of claim 9, wherein the tree data structure includes:
    a first node representing element A1;
    a second node representing element A2; and
    a third node representing the element N1, the third node being arranged as a child of the second node.

11. The apparatus of claim 8, further comprising:
    means for transferring the first and second arrays between a client and a server.

12. Apparatus comprising:
    means for receiving a first array that contains elements A1 and B1;

means for receiving a second array that contains elements A2 and B2, the second array comprising a first sub-array that contains elements N1 and M1, and a second sub-array that contains elements N2 and M2;

means for generating a first and second list based on the first and second arrays, the first list comprising the element A1 and the element A2, the element A2 comprising a first nested list comprising the element N1 and the element N2; the second list comprising the element B1 and the element B2, the element B2 comprising a second nested list comprising the element M1 and the element M2; and means for displaying data stored in the first list and the second list.

13. The apparatus of claim 12, wherein the means for generating a first and second list includes:

means for using a tree data structure to parse the first and second arrays.

14. The apparatus of claim 12, wherein the tree data structure includes:

a first node representing element A1;

a second node representing element A2; and a third node representing the element N1, the third node being arranged as a child of the second node.

* * * * *

UNITED STATES PATENT AND TRADEMARK OFFICE
CERTIFICATE OF CORRECTION

PATENT NO.       : 7,167,869 B2
APPLICATION NO.  : 10/672073
DATED            : January 23, 2007
INVENTOR(S)      : Malte Wedel et al.

It is certified that error appears in the above-identified patent and that said Letters Patent is hereby corrected as shown below:

On the cover page, Item (73), "SAG AG," should read --SAP AG,--.

Signed and Sealed this

Twenty-sixth Day of February, 2008

JON W. DUDAS
*Director of the United States Patent and Trademark Office*